(12) United States Patent
Peng et al.

(10) Patent No.: US 7,288,133 B1
(45) Date of Patent: Oct. 30, 2007

(54) THREE-PHASE NANOCOMPOSITE

(75) Inventors: Jack Y. Peng, Westlake Village, CA (US); Mark R. van den Bergh, Los Angeles, CA (US); William C. Harrigan, Northridge, CA (US)

(73) Assignee: DWA Technologies, Inc., Chatsworth, CA (US)

( * ) Notice: Subject to any disclaimer, the term of this patent is extended or adjusted under 35 U.S.C. 154(b) by 0 days.

(21) Appl. No.: 10/774,766

(22) Filed: Feb. 6, 2004

(51) Int. Cl.
*C22C 21/00* (2006.01)

(52) U.S. Cl. .............................. 75/249; 75/235; 75/236

(58) Field of Classification Search ................ 75/232, 75/236, 238, 249, 235
See application file for complete search history.

(56) References Cited

U.S. PATENT DOCUMENTS

| | | | | |
|---|---|---|---|---|
| 3,740,210 A | * | 6/1973 | Bomford et al. ............... 75/352 |
| 3,816,080 A | * | 6/1974 | Bomford et al. ............... 75/233 |
| 4,623,388 A | * | 11/1986 | Jatkar et al. ................... 75/232 |
| 4,812,289 A | * | 3/1989 | Alexander ................... 420/528 |
| 4,915,605 A | * | 4/1990 | Chan et al. ..................... 419/6 |
| 4,999,336 A | * | 3/1991 | Nadkarni et al. ........... 505/124 |
| 5,561,829 A | * | 10/1996 | Sawtelll et al. ............... 419/13 |
| 6,398,843 B1 | * | 6/2002 | Tarrant ........................ 75/249 |
| 6,630,008 B1 | * | 10/2003 | Meeks, III et al. ........... 75/236 |
| 6,630,100 B1 | * | 10/2003 | Murakami et al. ............ 419/12 |
| 2002/0021779 A1 | * | 2/2002 | Murakami et al. .......... 376/423 |

\* cited by examiner

*Primary Examiner*—Roy King
*Assistant Examiner*—Ngoclan T. Mai
(74) *Attorney, Agent, or Firm*—Thomas I. Rozsa; Tony D. Chen

(57) ABSTRACT

A three-phase nanocomposite that comprises about 0.5 to 10 vol % nano-scale aluminum oxide particles and about 1 to 45% high modulus ceramic particles and an aluminum alloy matrix. The nano phase is to enhance nanocomposite strength and the modulus phase is to enhance the specific modulus of the resulting nanocomposite.

13 Claims, No Drawings

THREE-PHASE NANOCOMPOSITE

BACKGROUND OF THE INVENTION

1. Field of the Invention

The present invention generally relates to the field of industrial production of aluminum alloys, and more particularly the field of industrial production of aluminum metal matrix nanocomposites

2. Description of the Prior Art

Currently 2000, 4000 and 6000 series aluminum alloys are widely used for lightweight structural applications that do not require high material strength and high specific stiffness or modulus. Highly loaded structural applications produced from aluminum alloys typically use 7000 series alloys. Aluminum alloys in the 7000 series are also more difficult to form into final products than competing 2000 and 6000 series aluminum alloys.

Particularly, Micro Ceramic Particulate Reinforced Aluminum Matrix Composites (MCP-AMCs) have been used in the aerospace industry and other areas due to their high specific stiffness. Aluminum oxide, boron carbide and silicon carbide micro size powders are the most common reinforcements. The specific stiffness increase is dictated by the properties of the ceramic used. Boron carbide has the highest elastic modulus and the lowest density of these reinforcements.

Silicon carbide, which has a slightly lower elastic modulus and higher density than boron carbide, yields a MCP-AMC with intermediate properties. Aluminum oxide has the highest density and the lowest modulus among the three ceramics. Therefore, $Al_2O_3$ reinforce aluminum possesses the lowest specific properties.

The strength of a MCP-AMC is mainly determined by the strength of the aluminum matrix alloy. The strength of a MCP-AMC using a 6000 series aluminum alloy matrix is not as high as the strength of 7000 series aluminum. For example, 15 volume % SiC reinforced 6061 aluminum has a yield strength of 58 ksi., which is lower than the 62 ksi. for 7075-T76 aluminum alloy.

It has been shown that Nano Ceramic Particulate Reinforced Aluminum Matrix Composites (NCP-AMCs) have higher strength than that of MCP-AMCs. Uniformly distributed nano-scale ceramic particles in an aluminum matrix enhance the strength of the resultant composite. For example, a uniform distribution of about 0.5 volume % of nano-scale aluminum oxide in 6092 aluminum increases the strength of the NCP-AMC about 10%. The same amount of micro ceramic powder uniformly distributed in a pure aluminum alloy has no effect to the strength.

U.S. patent application Ser. No. 10/738,275 by Peng et al. disclosed how to produce nano aluminum oxide reinforced aluminum matrix composites, which can have up to about 45 vol. % nano phase $Al_2O_3$ reinforcement. However, the specific stiffness or specific modulus of such nano aluminum composite is lower than that of a micro $B_4C$ or SiC powder reinforced aluminum matrix composite.

SUMMARY OF THE INVENTION

The present invention is a novel and unique three-phase nanocomposite.

The primary object of the present invention is to create a novel and unique nanocomposite system that has high strength and high specific stiffness.

Described briefly, the present invention is a three-phase nanocomposite that comprises about 0.5 to 10 vol % nano-scale aluminum oxide particles and about 1 to 45% high modulus ceramic particles and an aluminum alloy matrix. The nano phase is to enhance nanocomposite strength and the modulus phase is to enhance the specific modulus of the resulting nanocomposite.

Further novel features and other objects of the present invention will become apparent from the following detailed description, discussion and the appended claims.

DETAILED DESCRIPTION OF THE PREFERRED EMBODIMENTS

Although specific embodiments of the present invention will now be described, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The nanocomposite of this invention is a three-phase nanocomposite system. The first phase is an aluminum alloy matrix phase. The second is a nano aluminum oxide phase that provides strength enhancement. The third is a micro-scale ceramic particle phase possessing a higher modulus than aluminum oxide that contributes to stiffness enhancement. For simplification, the aluminum alloy matrix phase is called the matrix phase, the nano aluminum oxide phase is called the nano phase and the high modulus ceramic phase is called the modulus phase. The nano phase and the modulus phases are uniformly distributed throughout the matrix to form the nanocomposite that has high strength and high specific stiffness.

The matrix phase can be 2000, 6000 or 7000 series aluminum as defined by the Aluminum Association, or other aluminum alloys. The modulus phase can be boron carbide, silicon carbide or other ceramic powders that have higher modulus than aluminum oxide. The modulus phase can be in the nano-scale or micro-scale range. The nano-scale modulus phase does not offer better specific stiffness enhancement than the micro-scale modulus phase. The micro-scale phase is also preferred for better producibility.

The average particle size of the micro-scale modulus phase is from about 0.2 to 15 microns. The volume loading of the nano phase is about 0.5 to 10 percent. The modulus phase in the composite has about 1 to 45 volume percent. Examples of the material system compositions for the three-phase nanocomposite of this invention are contained in Table 1.

The three-phase nanocomposite can be produced by consolidating a uniform mixture of aluminum alloy powder, nano aluminum oxide powder and the micro-scale ceramic powder.

A low-cost manufacturing method of producing the three-phase nanocomposite is to modify the manufacturing method of nanocomposites disclosed in U.S. patent application Ser. No. 10/738,275 by Peng et al. The major sequential steps of the manufacturing method of this invention are described as the following:

Step 1. Preparing the Nano-$Al_2O_3$-Surface Aluminum Powder for the Nano Phase

The nano phase is created by breaking the nano aluminum oxide layer on the aluminum powder surface into a nano-scale reinforcement for strength enhancement. The total volume percent of the $Al_2O_3$ nano-scale phase, $N_T$, and the total volume percent of the modulus phase, $V_M$, the total volume percent of the aluminum phase in the nanocomposite is $V_{Al}$, in a three-phase nanocomposite are predetermined according to the strength and modulus requirement to be met as well as the aluminum matrix alloy type. Different applications may require different $N_T$ and $V_M$. $N_T$ is about 0.5 to 10 vol % and $V_M$ is about 1 to 45 vol %. The volume percent of nano phase $Al_2O_3$, $N_{Al}$, needed in the aluminum powder can be calculated by Equation [1]:

TABLE 1

THREE-PHASE NANOCOMPOSITE SYSTEM
Three-Phase Nanocomposite

| Matrix Phase | | Nano Phase | | | Modulus Phase | | |
|---|---|---|---|---|---|---|---|
| Metal | Chemicals | Ceramic | Particle size (nm) | Volume % | Ceramic | Particle size (m) | Volume % |
| Aluminum alloy | 2000, 6000, and 7000 series or other Al alloys | $Al_2O_3$ | ~10-800 | ~0.5-10 | $B_4C$, SiC or other high modulus ceramics | ~0.2-15 | ~1-45 |

$$N_{Al} = N_T(1 + V_M/V_{Al}) \quad [1]$$

The total volume percentage of nano-scale $Al_2O_3$ on a spherical shaped aluminum powder, the size of average aluminum powder particle size D and the thickness of the nano-scale $Al_2O_3$ layer have a relationship defined by Equation [2]:

$$N_{Al} = 1 - (1 - 2T/D)^3 \quad [2]$$

For a given thickness of the nano-scale $Al_2O_3$ surface layer, the smaller average particle size, the more total $Al_2O_3$ is formed.

The volume percent of $Al_2O_3$ in an aluminum powder of irregular shape is also a function of the average particle size of the powder and the thicknesses of $Al_2O_3$ layer. The relationship between $Al_2O_3$ volume percentage, particle size and layer thickness for irregularly shaped aluminum powder will be similar to that found in spherical particles. A geometric factor is required to account for the greater surface to volume for the nonspherical particles.

Spherical shaped aluminum powder is used in this invention because it is easier to analyze. A spherical shape has the smallest surface to volume ratio, which provides the highest thickness of $Al_2O_3$ for a given particle size and total oxide content.

This invention uses the Equation [1] to determine the volume percentage of nano-scale $Al_2O_3$ layers needed for a three-phase nanocomposite. Equation [2] is used to control the production of aluminum powder with a nano-scale $Al_2O_3$ surface layer.

There are generally three ways to control the $Al_2O_3$ volume percent in the aluminum powder.

(1) For Existing Aluminum Powder with a Fixed Thickness $Al_2O_3$ Surface Layer:
   (a) Determining the $Al_2O_3$ layer thickness of aluminum powder produced by an aluminum powder with manufacturer. The thickness can be indirectly measured. First, measure the total $Al_2O_3$ percentage of the aluminum with a known average particle size. Calculate the thickness of the $Al_2O_3$ layer by Equation [2];
   (b) Using Equation [2] again, calculate the average particle size needed for a predetermined $Al_2O_3$ vol %; and
   (c) Classify the aluminum powder to the same average particle size as the calculated value.

(2) For Existing Aluminum Powder that Possesses a Large Average Particle Size:
   (a) Measuring the average particle size;
   (b) Determining the existing $Al_2O_3$ layer thickness by the method in (1)(a);
   (c) Determining the required thickness of $Al_2O_3$ layer by the Equation [2] for a predetermined $Al_2O_3$ vol %; and
   (d) Increasing the $Al_2O_3$ layer thickness if the existing thickness is less than the required thickness. The simplest way is to heat treat the aluminum powder in dry air at a temperature below the aluminum's melting point.

A fluidized bed furnace is an efficient method for increasing the thickness of the $Al_2O_3$ layer. The $Al_2O_3$ thickness is controlled by the temperature and the furnace cycle time.

Step 2. Preparing Powder Mixture

The second step is to create a powder mixture that contains all necessary elements required to create the three-phase nanocomposite.

The modulus phase powder is selected from boron carbide, silicon carbide and other ceramic powders that have a modulus higher than aluminum oxide. The average particle size of the modulus phase ceramic powder is from about 0.2 to 15 microns with a normal particle size distribution. The chemical purity of the modulus phase ceramic powder is greater than about 98%.

The nano phase will be created by breaking the nano $Al_2O_3$ surface layers on the aluminum particles during the consolidation step (Step 3) and subsequent metalworking.

The matrix phase is the aluminum alloy. The aluminum alloy is selected from aluminum alloys containing elements taken from aluminum, boron, cobalt, copper, iron, magnesium, manganese, nickel, silicon, titanium, zinc, alloys and combination thereof. There are two routes to prepare the aluminum alloy matrix:

(1) Aluminum Alloy Powder with Nano-Scale Surface Aluminum Oxide:

By following the procedure in Step 1, the aluminum alloy powder with a predetermined percentage of nano-scale surface aluminum oxide can be produced by atomizing a desired aluminum alloy ingot. Such aluminum alloy powder is ready to be mixed with the modulus phase ceramic powder.

(2) Mixing Alloy Elemental Powders with an Unalloyed Aluminum Powder with a Nano-Scale Surface Oxide:

The powder metallurgy method of creating an aluminum alloy by blending elemental powders is employed when unalloyed aluminum powder with a nano-scale surface aluminum oxide is used. The unalloyed aluminum powder, alloy elemental powders and the ceramic powder are prepared in Step 2(1) and the constituents are uniformly mixed using a blender, jet mill or ball mill to form a powder mixture.

The alloy elemental powders are selected from the group consisting of boron, cobalt, copper, iron, magnesium, manganese, nickel, silicon, titanium, zinc, alloys and combination thereof. It is preferred that the average particle sizes of the alloy elemental powders be in the same particle size range as that of the unalloyed aluminum powder.

The $Al_2O_3$ volume percent should be adjusted according to the percentage of additional alloy elemental powder being used.

Step 3. Consolidating the Powder Mixture

The powder mixture is loaded into a billet tool and is pressed at room temperature to form a compacted mixture that has between about 50% and 95% of theoretical density. The billet tool size can be very small or sized for compacting quantities approaching about 1000 kg (2,200 lb) of powder.

There are various powder metallurgy methods that can be employed to consolidate the compacted mixture. The following are typical processes:

(1) Vacuum/Inert-Gas/Air Hot-Pressing:

Under vacuum, inert-gas or air, the compacted mixture is heated to a degassing temperature range and then is held at this range for more than about one-half hour for degassing purposes. The degassing temperature range is from between about 230° C. (450° F.) and less than the lowest eutectic melt temperature of any elemental alloy constituent powder in the matrix metal. The main function of degassing is to remove $H_2O$ from the metal powder mixture.

After the degassing period, the temperature is raised to the consolidation temperature. The highest consolidation temperature is the highest eutectic melt temperature of any alloy constituent powder in the metal matrix. However, the actual consolidation temperature may be below this eutectic melt temperature. The consolidation temperature is lower than the aluminum melting point.

The consolidation temperature is typically between about 230 and 615° C. (450 and 1145° F.). While the consolidation temperature and vacuum, inert-gas or air environment is maintained, the degassed, compacted mixture is pressed to full density resulting in a composite billet. In the case of a thin $Al_2O_3$ layer, consolidation of the powder should take place under vacuum or inert gas to prevent additional oxidation.

(2) Cold Isostatic Press/Sinter:

In the Cold Isostatic Press (CIP)/Sinter process, the powder mixture is compacted at room temperature in Step 3 to about 85% to 95% of theoretical density. Pressing the powder mixture to high density at room temperature requires pressures between about 50,000 psi and 85,000 psi. Typically, a Cold Isostatic Press is employed.

The compacted mixture is then sintered in vacuum, in inert-gas, or in air. The compacted mixture is heated to the degassing temperature range and then is held at this temperature range for more than about one-half hour to be degassed. After degassing, the degassed compacted mixture is heated to a sintering temperature that is the highest eutectic melt temperature of the elemental powder in the matrix metal so that sintering of the matrix metal takes place to form the composite billet. This sintered composite billet has a density that is still approximately that of the starting compacted mixture, between 85% and 95% of the theoretical density, sealed by the sintering process. This sealing is needed to avoid internal oxidation of alloy elements in the billet during subsequent hot working. The composite will have 98% to 100% of the theoretical density after following metal working.

In the case of aluminum powders with a thin $Al_2O_3$ layer, sintering should take place under vacuum or inert gas to prevent additional oxidation.

(3) Cold Compacting/Hot Press:

In the case of alloyed aluminum powder with a thick $Al_2O_3$ layer, the powder mixture can be consolidated without degassing since the thick $Al_2O_3$ layer prevents additional oxidization that is detrimental to the resultant composite. The mixture is loaded into a billet tool and is pressed at room temperature to form a compacted mixture that is between about 50% and 95% of the theoretical density.

The compacted mixture is heated to the consolidation temperature in vacuum, inert-gas or air. While the consolidation temperature and vacuum, inert-gas, or air continues to be maintained, the compacted mixture is hot pressed to approximately 98 to 100% of theoretical density to produce the composite billet.

Boron carbide and silicon carbide are harder than aluminum oxide. $B_4C$ and SiC powder particles have irregular shapes and sharp edges. There is great shear and crash forces between aluminum power and modulus ceramic powder to help break the $Al_2O_3$ layers on surfaces of aluminum powder into nano $Al_2O_3$ particles.

Step 4. Metal Working the Composite Billet

Most of the $Al_2O_3$ surface layers are broken up during billet consolidation due to their brittle nature. Unaffected $Al_2O_3$ surface layers are broken up during cold or hot metal working, or any combination of these steps.

The cold work can be cold extrusion, cold forging, cold rolling or any combination of these steps. During hot metal working, the composite billet is plastically deformed at a temperature between about 230 and 615° C. (450 and 1145° F.), which is below the melting point of aluminum. The hot metal working can be hot extrusion, hot forging or hot rolling or any combination of these steps.

The metal working can be incorporated as part of fabrication processes for producing final three-phase nanocomposite products. After the consolidation and metal working, the $Al_2O_3$ surface layers of nano-scale thickness are broken into a nano-scale $Al_2O_3$ particulate reinforcement phase which is uniformly distributed in the composite resulting in a homogenous three-phase nanocomposite.

Described generally, the present invention is a nanocomposite comprises an aluminum alloy phase, a nano-scale aluminum oxide phase, and a modulus phase.

Particularly, in the present invention three phase nanocomposite described above: (1) the aluminum alloy includes elements taken from aluminum, boron, cobalt, copper, iron, magnesium, manganese, nickel, silicon, titanium, zinc, alloys and combination thereof; (2) the nano-scale aluminum oxide phase is nano-scale aluminum oxide particles having an average particle size between about 10 nm to about 800 nm and being uniformly distributed in the nanocomposite; and (3) the modulus phase is ceramic particles selected from boron carbide powder, silicon carbide powder or other ceramic powders having higher elastic modulus than that of aluminum oxide and having an average particle size between about 0.2 microns to about 15 microns and being uniformly distributed in the nanocomposite.

Preferably, the present invention nanocomposite described above has about 0.5 to about 10 volume percentage of the nano aluminum oxide particles, and about 1 to about 45 volume percentage of the modulus ceramic particles.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A nanocomposite which is manufactured from applying particles of materials, comprising:
   a. aluminum or aluminum alloy particles with nano-scale surface aluminum oxide comprised of an aluminum metal or aluminum alloy inside of said particles and an aluminum oxide layer on the outside of said particles, and particles of a modulus phase; and
   b. said aluminum oxide layer of the particles is quantitatively controlled from a volume percent of nano phase aluminum oxide needed in said particles which is defined by a $N_{Al}$, and is specified by:

$$N_{Al}=N_T(1+V_M/V_{Al})$$

where $N_T$ is a volume percent of the nano phase aluminum oxide in the nanocomposite, $V_M$ is a total volume percent of the modulus phase, and $V_{Al}$ is a total volume percent of the aluminum phase in the nanocomposite.

2. The nanocomposite in accordance with claim 1, wherein said aluminum alloy comprises elements taken from aluminum, boron, cobalt, copper, iron, magnesium, manganese, nickel, silicon, titanium, zinc, alloys and a combination thereof.

3. The nanocomposite in accordance with claim 1, wherein said nano-scale aluminum oxide is uniformly distributed in said nanocomposite.

4. The nanocomposite in accordance with claim 1, wherein said modulus phase is comprised of ceramic particles which are uniformly distributed in said nanocomposite.

5. The nanocomposite in accordance with claim 4, wherein said ceramic particles further include boron carbide powder particles, silicon carbide powder particles or other ceramic powder particles having higher elastic modulus than that of aluminum oxide.

6. The nanocomposite in accordance with claim 1, comprising about 0.5 to about 10 volume percentage of said nano phase aluminum oxide.

7. The nanocomposite in accordance with claim 1, comprising about 1 to about 45 volume percentage of said modulus ceramic particles.

8. The nanocomposite in accordance with claim 3, wherein said nano-scale aluminum oxide which is uniformly distributed in said nanocomposite, is in a form of particles having an average particle size between about 10 nm to about 800 nm.

9. The nanocomposite in accordance with claim 4, wherein said ceramic particles of said modulus phase, have an average particle size between about 0.2 microns to about 15 microns.

10. The nanocomposite in accordance with claim 1, wherein said aluminum or aluminum alloy particles with nano-scale surface aluminum oxide are comprised of an aluminum metal or aluminum alloy inside of said particles and an aluminum oxide layer on the outside of said particles and are preferably in a spherical shape.

11. The nanocomposite in accordance with claim 10, wherein said preferred spherical shaped aluminum or aluminum alloy particles with nano-scale surface aluminum oxide, wherein said aluminum oxide layer of the spherical particles is quantitatively controlled from a volume percent of nano phase aluminum oxide needed in said particles, which is defined by the symbol $N_{Al}$ and is specified by:

$$N_{Al}=1-(2T/D)^3,$$

where T is a thickness of the aluminum oxide layer, and D is an average size of said particles.

12. The nanocomposite in accordance with claim 1, further comprising an aluminum alloy phase, wherein said phase formed during a consolidation step and a subsequent metal working step from aluminum or aluminum alloy particles with nano-scale surface aluminum oxide comprised of an aluminum metal or aluminum alloy inside of said particles and an aluminum oxide layer on the outside of said particles.

13. The nanocomposite in accordance with claim 1, further comprising a nano-scale aluminum oxide phase comprising nano-scale aluminum oxide particles in said nanocomposite, said nano-scale aluminum oxide particles are prepared from the aluminum or aluminum alloy particles with nano-scale surface aluminum oxide comprised of an aluminum metal or aluminum alloy inside of said aluminum or aluminum alloy particles and an aluminum oxide layer on the outside of said aluminum or aluminum alloy particles, said nano-scale aluminum oxide phase is from said aluminum or aluminum alloy particles wherein said outside layer of aluminum oxides of said aluminum or aluminum alloy particles is broken in the processes of making said composite, wherein said breaking of said aluminum oxide layer of said aluminum or aluminum alloy particles does not happen in a step to make the powder mixture of said composite, and said breaking of said aluminum oxide layer happens during a consolidation step and subsequent metal working step, further an amount of said nano-scale aluminum oxide phase in said composite is quantitatively controllable in a step of making said aluminum or aluminum alloy particles with nano-scale surface aluminum oxide, and a modulus phase.

* * * * *